United States Patent [19]

Peng

[11] Patent Number: 5,531,516

[45] Date of Patent: Jul. 2, 1996

[54] CABINET FOR COMPACT DISK CONTAINERS

[76] Inventor: Jung-Ching Peng, P. O. Box 82-144, Taipei, Taiwan

[21] Appl. No.: 306,934

[22] Filed: Sep. 16, 1994

[51] Int. Cl.[6] .................................................. A47B 81/06
[52] U.S. Cl. .............................. 312/9.46; 211/40; 211/169
[58] Field of Search .................................. 312/9.45, 9.46, 312/9.48, 249.2; 211/40, 168, 169; 206/308.1, 308.12, 308.15, 307.1

[56] References Cited

U.S. PATENT DOCUMENTS

| | | | |
|---|---|---|---|
| 836,564 | 11/1906 | Cukier | 312/9.45 |
| 5,370,244 | 12/1994 | Peng | 211/40 |
| 5,423,434 | 6/1995 | Chew | 211/40 |

*Primary Examiner*—Peter M. Cuomo
*Assistant Examiner*—Gerald A. Anderson
*Attorney, Agent, or Firm*—Alfred Lei

[57] ABSTRACT

A cabinet for compact disc containers including a stand provided with an upper plate and a lower plate and formed with a vertical slot, a plurality of holders each being a U-shaped member with a cross member and two legs each leg extending from an end of the cross member, a stud extending downwardly through the hole of the upper plate to engage the recess of one of the holders at an upper position, and a plurality of retainers each formed with a circular portion, a rectangular portion and a neck portion between the circular portion and the rectangular portion.

1 Claim, 5 Drawing Sheets

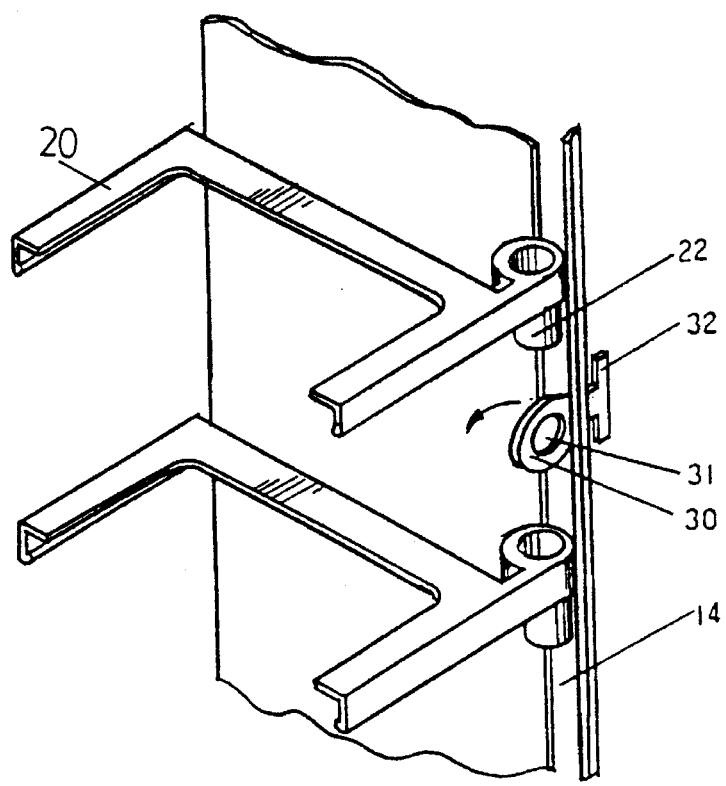
F I G. 2
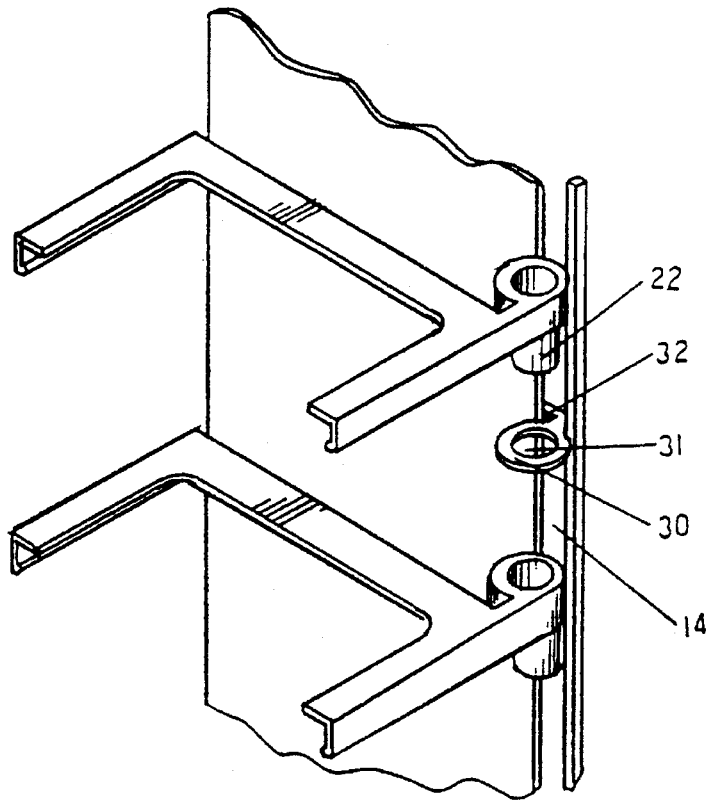
F I G. 3

# CABINET FOR COMPACT DISK CONTAINERS

BACKGROUND OF THE INVENTION

Devices for storing compact disks are well known in the art. However, none of the prior art devices available to the public has adequately met all of the goals of: simplicity of design; visual aesthetics; ready accessibility of contents; reliable operations mechanisms; visual accessibility of label information; and reasonable density of storage. Improvements in each of these areas is particularly desirable in the industry. Furthermore, it is of extreme value to provide a device which combines all of the desirable characteristics set forth above.

SUMMARY OF THE INVENTION

This invention relates to a cabinet for compact disc containers.

It is the primary object of the present invention to provide a cabinet for compact disk containers which can prevent the compact disk from dropping out.

It is another object of the present invention to provide a cabinet for compact disk containers which is easy to operate.

It is still another object of the present invention to provide a cabinet for compact disk containers which is simple in construction.

It is still another object of the present invention to provide a cabinet for compact disk containers which can store the compact disk in a secure but convenient manner.

It is a further object of the present invention to provide a cabinet for compact disk containers which is economic to produce.

These and other objects and advantages of the present invention will become clear to those skilled in the art in view of the description of the best presently known mode of carrying out the invention and the industrial applicability of the preferred embodiment, as described herein and as illustrated in the several figures of the drawing.

BRIEF DESCRIPTION OF THE DRAWINGS

FIGS. 2 and 3 show the installation of the retainer;

DETAILED DESCRIPTION OF THE PREFERRED EMBODIMENT

Figure 1:
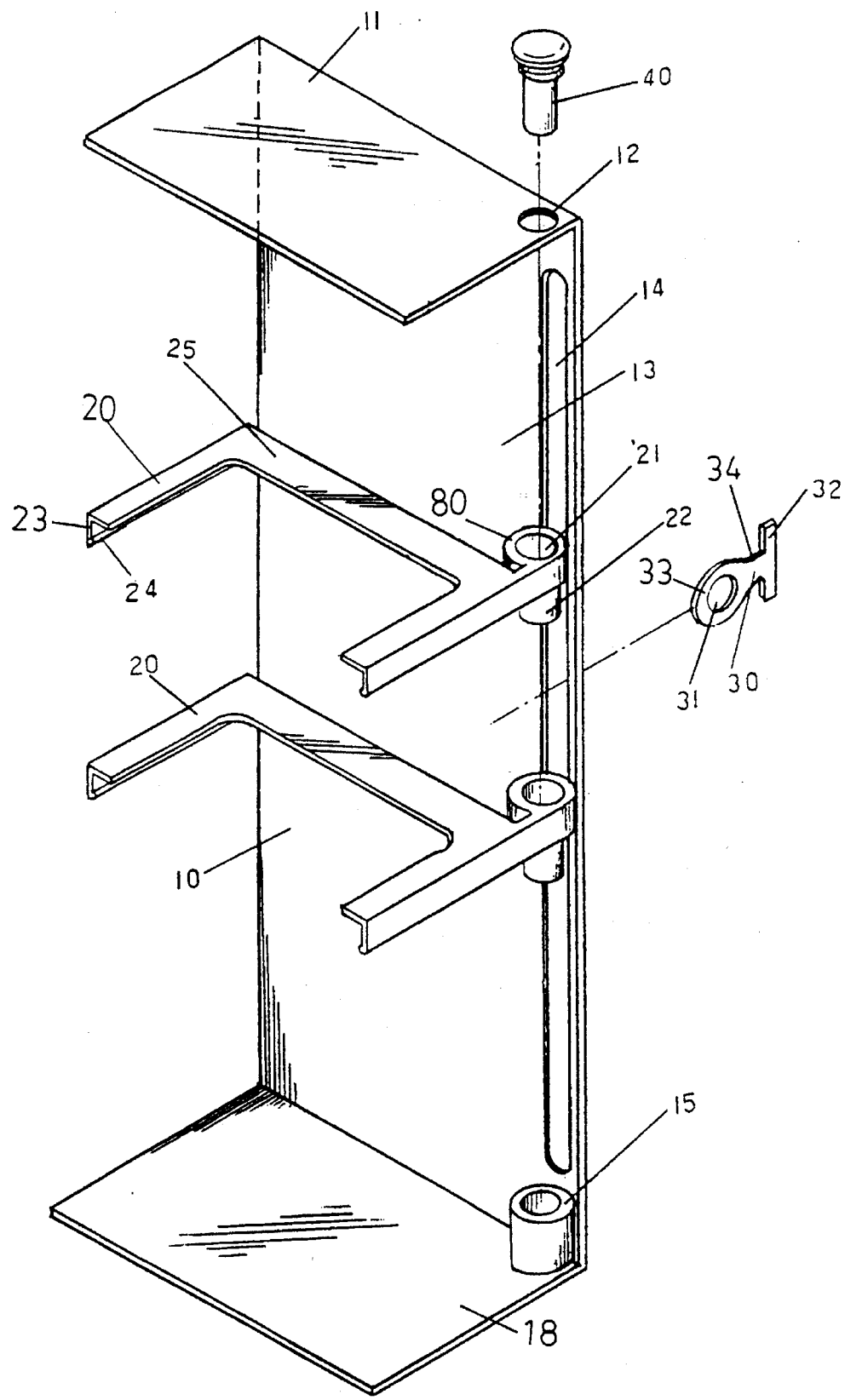
FIG. 1 is an exploded view of the present invention.
Figure 4:
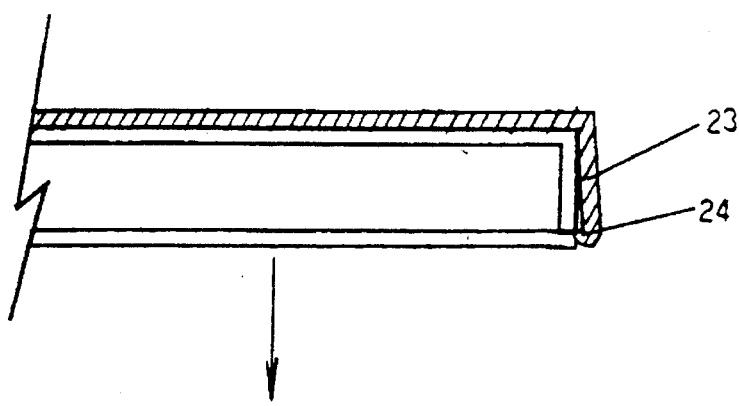
FIGS. 4, 5 and 6 show the working principle of the present invention.
Figure 5:
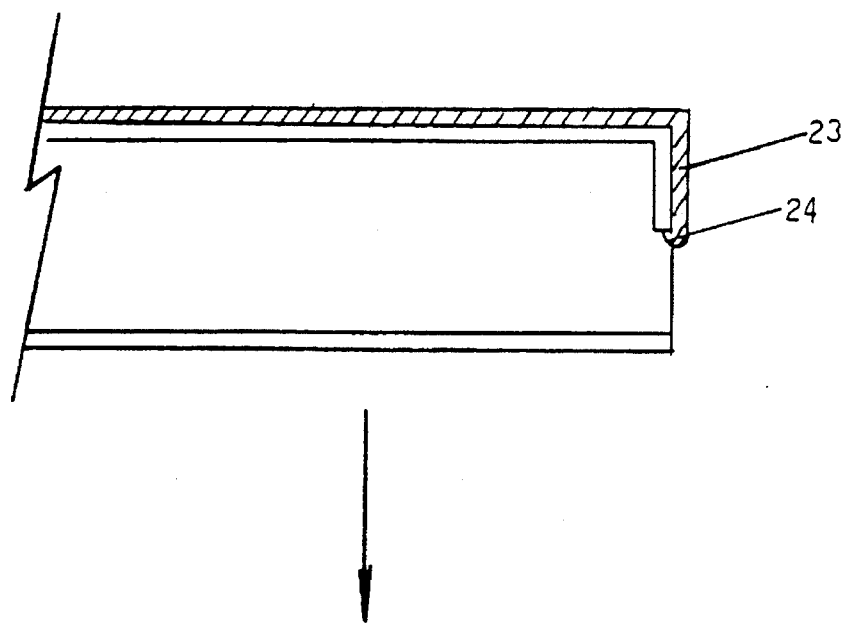

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIGS. 1, 2 and 3 thereof, the cabinet for compact disk containers according to the present invention mainly comprises a stand 10, a plurality of holders 20, a plurality of retainers 30, and a stud 40.

The stand 10 is provided with an upper plate 11 and a lower plate 18 and is formed with a vertical slot 14 at one side. The upper plate 11 is formed at a corner with a hole 12 which has a center line lying on the same plane going through the center line of the vertical slot 14. On a corner of the lower plate 18 is fixedly mounted a tubular member 15 concentric with the hole 12.

Figure 6:
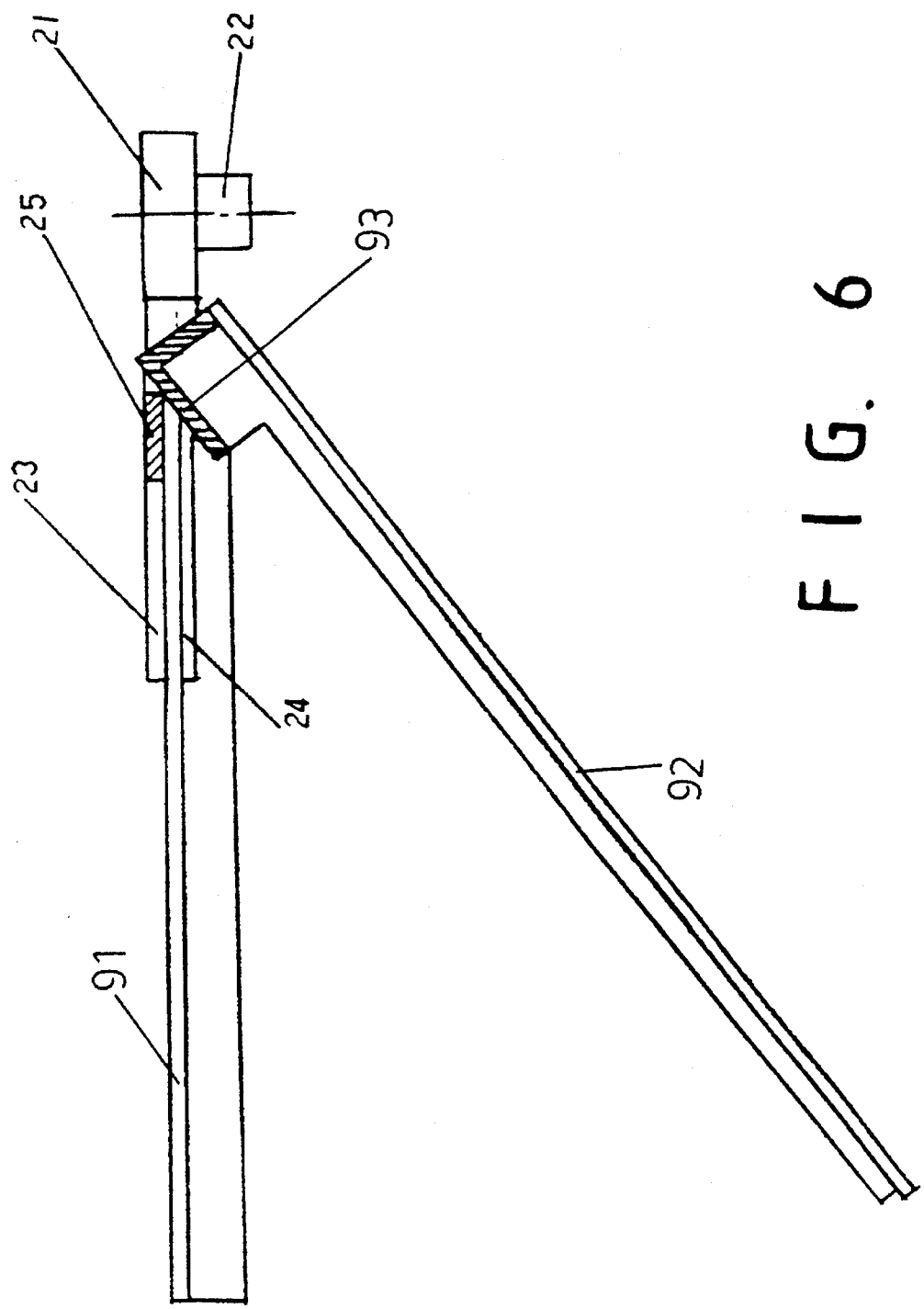
Figure 7:
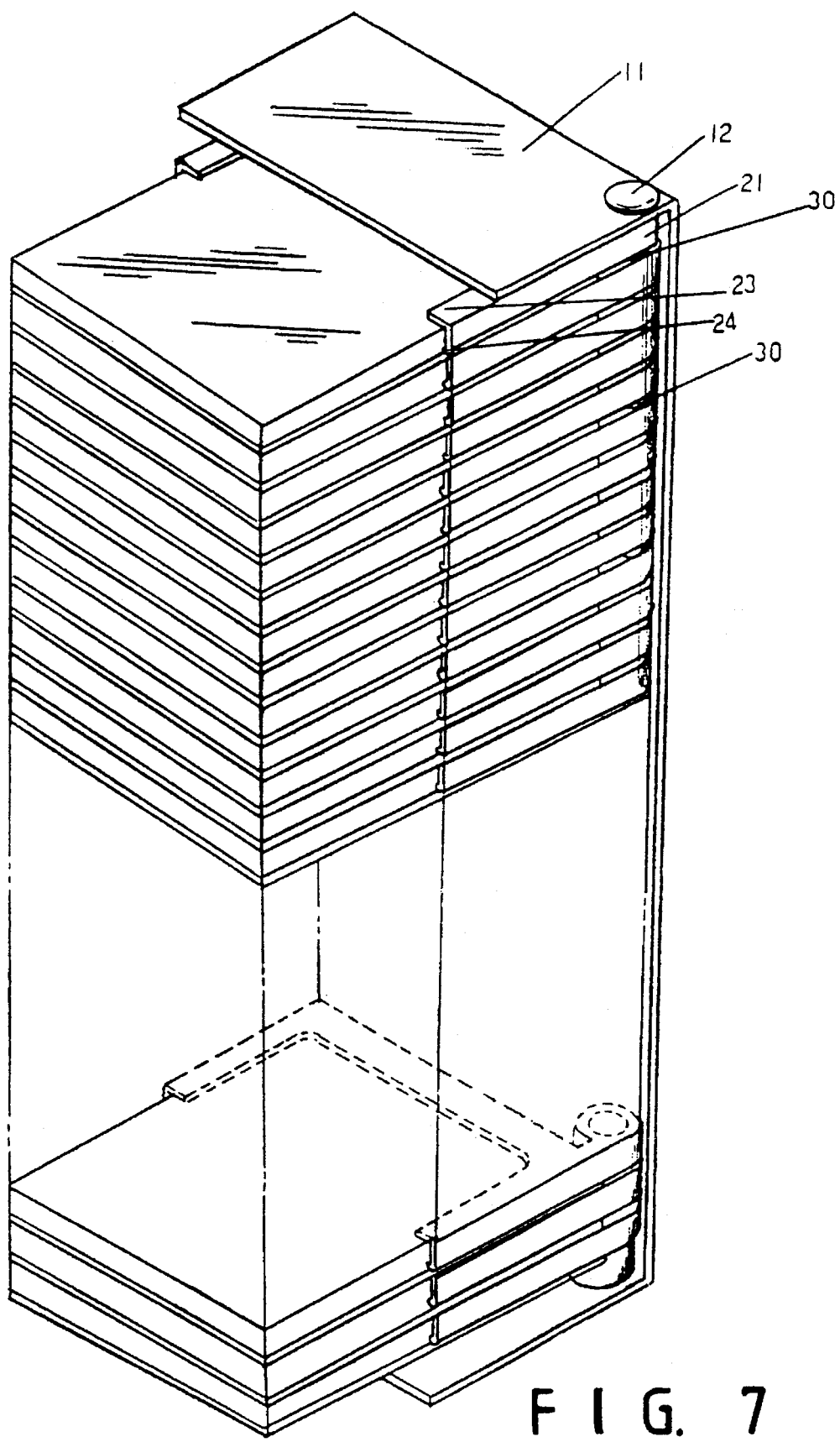
FIG. 7 is a perspective view of the present invention.

The holder 20 is a U-shaped member having a cross member 25 and two legs 23 each extending from an end of the cross member 25. The leg 23 is formed at the lower end with a protruded portion 24 which is designed to be fitted between an upper cover 91 and a lower cover 92 of a compact disk container (see FIG. 6). In addition, the holder 20 has a tubular portion 80 which is formed with a recess 21 on the upper end and a cylindrical portion 22 at the lower end. The cylindrical portion 22 of a holder 20 is adapted to be fitted into the recess 21 of another holder 20. The recess 21 of the holder 20 at the uppermost position is engaged with the stud 40. The cylindrical portion 22 of the holder 20 at the lowermost position is fitted into the tubular member 15.

The retainer 30 is formed with a circular portion 33, a rectangular portion 32, and a neck portion 34 between the circular portion 33 and the rectangular portion 32. The circular portion 33 has a central hole 31 for receiving the cylindrical portion 22 of the holder 20. The retainer 30 is snugly fitted in an appropriate position of the vertical slot 14 of the stand 10, with its circular portion 33 receiving the cylindrical portion 22 of the holder 20 thereby providing additional support for the holder 20.

When in use (see FIGS. 4, 5, 6 and 7), simply insert the compact disk container into a holder 20, with the protruded portions 24 of the holder 20 fitted between the upper cover 91 and the lower cover 92 of the holder 10. When desired to open the compact disk container, first turn the desired holder 20 out of the stand 10 and then pull down the lower cover 92 of a compact disk container thereby enabling the compact disk (not shown) to be taken out thereof. In the meantime, the upper cover 91 of the compact disk container is supported by the protruded portions 24 of the holder 20 hence preventing the upper cover 92 to be pulled down together with the lower cover 92. Further, as the lower cover 92 of the compact disk container is pulled down, the spine 93 of the lower cover 92 will be in contact with the cross member 25 of the holder 20 thus limiting the maximum opening angle of the compact disk container.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A cabinet for compact disk containers comprising:

a stand provided with an upper plate and a lower plate connected by a side with a vertical slot, said upper plate having at least one corner and being formed at a corner with a hole having a center line in a plane going through a center line of said vertical slot, said lower plate being provided with the center line of a tubular member concentric with the hole of said upper plate;

a plurality of holders being a U-shaped member with a cross member and two legs each extending from an end of the cross member, each of said legs being formed at a lower end with a protruded portion, each of said holders having a tubular portion formed with a recess at an upper end and a cylindrical portion at a lower end, the cylindrical portion of one of said holders being adapted to be fitted in the recess of another one of said holders;

a stud extending downwardly through the hole of said upper plate to engage the recess of one of said holders at an upper position; and a plurality of retainers each formed with a circular portion, a rectangular portion and a neck portion between the circular portion and the rectangular portion, said retainers being snugly fitted in the vertical slot of said stand with the circular portion having a central hole receiving the cylindrical portion of said holder.

* * * * *